(12) United States Patent
Palmer et al.

(10) Patent No.: US 7,420,153 B2
(45) Date of Patent: *Sep. 2, 2008

(54) LOW-LIGHT VIEWING DEVICE HAVING CAMERA ASSEMBLY WITH IMAGE SIGNAL CONTAINING VISIBLE LIGHT AND INFRARED ENERGY COMPONENTS AND METHOD FOR CONTROLLING SAME

(75) Inventors: Gary Palmer, Carlsbad, CA (US); Jeffrey Kennedy, San Juan Capistrano, CA (US)

(73) Assignee: Xenonics, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/638,203

(22) Filed: Dec. 13, 2006

(65) Prior Publication Data

US 2007/0090277 A1    Apr. 26, 2007

Related U.S. Application Data

(63) Continuation of application No. 11/257,300, filed on Oct. 24, 2005, now Pat. No. 7,173,237, which is a continuation-in-part of application No. 11/060,903, filed on Feb. 18, 2005.

(60) Provisional application No. 60/621,415, filed on Oct. 22, 2004.

(51) Int. Cl.
*H01J 40/14* (2006.01)

(52) U.S. Cl. .............................. 250/214 VT; 250/208.1

(58) Field of Classification Search .......... 250/214 VT, 250/214.1, 239, 208.1, 214 R
See application file for complete search history.

(56) References Cited

U.S. PATENT DOCUMENTS

| | | | |
|---|---|---|---|
| 3,509,344 A | 4/1970 | Bouwers | |
| 3,752,983 A | 8/1973 | Yanez | |
| 3,781,560 A | 12/1973 | DeBurgh et al. | |

(Continued)

FOREIGN PATENT DOCUMENTS

GB    2166259    6/1986

(Continued)

OTHER PUBLICATIONS

"Operating Instructions for Meade NightView" "Digital Night Vision Monocular", Meade Instruments Company (2 pages).

*Primary Examiner*—Que T Le
(74) *Attorney, Agent, or Firm*—Howard IP Law Group, PC

(57) ABSTRACT

A digital low-light viewing device comprises a housing having a first end and an opposing second end, the first end defining an optical input aperture and the second end defining an optical output aperture; an infra-red camera assembly responsive to low intensity light and infra red energy received via the input aperture for generating an output image; a signal processor coupled to the camera assembly for processing the output image; a display assembly coupled to the camera assembly for displaying the processed image; a zoom lens assembly coupled to the camera assembly for electronically variably focusing the output image; and control electronics responsive to a control mechanism disposed on a surface of the housing for controlling operating functions of the low-light viewing device, the control mechanism navigable via a user's digit for controlling the operating functions.

20 Claims, 11 Drawing Sheets

U.S. PATENT DOCUMENTS

| | | | |
|---|---|---|---|
| 3,833,805 A | | 9/1974 | Naiman et al. |
| 4,266,873 A | | 5/1981 | Hacskaylo et al. |
| 4,642,452 A | | 2/1987 | Loy |
| 4,707,595 A | | 11/1987 | Meyers |
| 4,794,246 A | | 12/1988 | Kastendieck |
| 4,896,218 A | | 1/1990 | Vick |
| 5,035,472 A | * | 7/1991 | Hansen .................. 359/350 |
| 5,113,177 A | | 5/1992 | Cohen |
| 5,185,670 A | * | 2/1993 | Lee ........................ 348/347 |
| 5,200,827 A | | 4/1993 | Hanson et al. |
| 5,383,200 A | | 1/1995 | Barrett et al. |
| 5,396,069 A | | 3/1995 | Craig et al. |
| 5,408,359 A | | 4/1995 | Ferrett et al. |
| 5,471,374 A | | 11/1995 | Palmer |
| 5,594,254 A | | 1/1997 | Palmer |
| 5,729,016 A | | 3/1998 | Klapper et al. |
| 5,815,126 A | | 9/1998 | Fan et al. |
| 5,907,150 A | * | 5/1999 | Saldana ............. 250/214 VT |
| 5,943,174 A | | 8/1999 | Bryant et al. |
| 5,949,582 A | | 9/1999 | Coombs |
| 6,116,744 A | | 9/2000 | Batterman |
| 6,388,707 B1 | | 5/2002 | Suda |
| 6,489,986 B1 | * | 12/2002 | Allen ..................... 348/14.01 |
| 6,538,820 B2 | | 3/2003 | Fohl et al. |
| 6,560,029 B1 | | 5/2003 | Dobbie et al. |
| 6,570,147 B2 | | 5/2003 | Smith |
| 6,603,507 B1 | | 8/2003 | Jiang et al. |
| 6,614,606 B2 | | 9/2003 | Jones |
| 6,762,884 B2 | * | 7/2004 | Beystrum et al. .......... 359/629 |
| 2002/0030163 A1 | | 3/2002 | Zhang |
| 2002/0122302 A1 | | 9/2002 | Palmer |
| 2003/0015662 A1 | | 1/2003 | Yang et al. |
| 2007/0246641 A1 | | 10/2007 | Baun |

FOREIGN PATENT DOCUMENTS

WO        03096216        11/2003

* cited by examiner

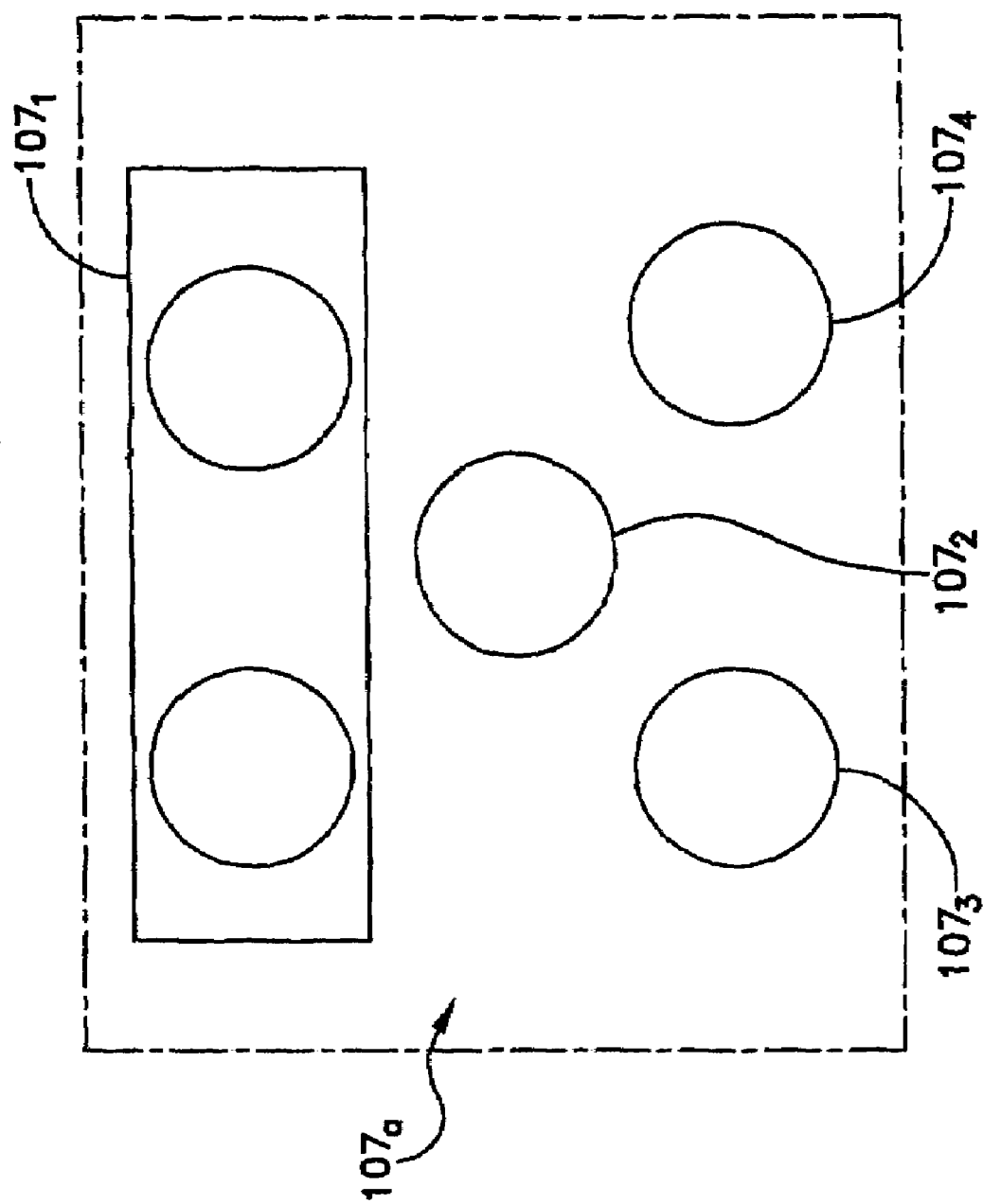

LOW-LIGHT VIEWING DEVICE HAVING CAMERA ASSEMBLY WITH IMAGE SIGNAL CONTAINING VISIBLE LIGHT AND INFRARED ENERGY COMPONENTS AND METHOD FOR CONTROLLING SAME

RELATED APPLICATIONS

This application is a continuation of U.S. patent application Ser. No. 11/257,300, filed Oct. 24, 2005 now U.S. Pat. 7,173,237, entitled "Ruggedized Digital Low Light Viewing Device, the subject matter thereof incorporated by reference herein in its entirety, which claims priority to U.S. Provisional Application Ser. No. 60/621,415, filed Oct. 22, 2004, the subject matter thereof incorporated by reference herein in its entirety, and further claims priority to and is a continuation-in-part of U.S. patent application Ser. No. 11/060,903, filed on Feb. 18, 2005 entitled "Portable Long Range Searchlight With Telescopic Viewing and Imaging Systems", the subject matter thereof incorporated by reference herein in its entirety.

FIELD OF THE INVENTION

The present invention relates generally to optical devices that enable a viewer to detect, recognize, identify and observe objects under low-light conditions, and more particularly, to a handheld, ruggedized digital low-light viewing system.

BACKGROUND OF THE INVENTION

Low-light viewing systems are widely used in the military to provide soldiers, aviators and sailors with the ability to view objects at night or during other low-light conditions. As a result, many low-light viewing devices are currently being manufactured according to exacting military specifications and designs. Similarly, many such low-light devices are being manufactured for specific military applications, such as part of the sights of various weapons or as part of goggle assemblies that attach to an aviator's or soldier's helmet. However, many of the present low-light viewing devices currently being manufactured are neither affordable nor easily adapted to non-military uses.

Low-light viewing devices fall into several broad categories, including: (1) image intensified products, (2) thermal imaging products, and (3) charge-coupled device (CCD) and complementary metal-oxide-semiconductor (CMOS) low-light cameras. The image intensified and thermal imaging devices are often found in the military, law enforcement, fire fighting, and consumer markets. In recent years a number of low-light viewing devices have been introduced into the consumer market, but are often of poor quality and/or offer the user limited capabilities.

Image intensified low-light viewing devices tend to be very expensive and require sophisticated, heavy lenses to produce long range images. Image intensified devices are also quite prone to damage if used in high-light situations. This characteristic renders such products virtually useless in most urban areas. Moreover, due to excessive cost, thermal imaging devices have not been widely accepted.

Low-light CCD cameras are commonly employed in security applications. In recent years, cell phone technology, as well as a tremendous surge in the application of cameras in the security business, has provided for very inexpensive cameras. Low-light CCD cameras are designed to be sensitive at a wavelength in the electromagnetic spectrum that is invisible to human beings, making these cameras very effective in low-light conditions, particularly if active infrared (IR) illumination is employed.

Devices that utilize active IR illumination often utilize integral LEDs to illuminate dark scenes. Most digital low-light viewing devices currently on the market utilize fixed-focus lenses which must be manually adjusted and are active devices, i.e., providing IR illumination to assist in detection, which causes the devices to consume power quickly.

The aforementioned devices are deficient in several respects, precluding practical use in both commercial arenas and by the military and law enforcement agencies. Such devices tend to be both heavy and fragile, are unable to withstand the shock of impact and wear and tear caused by regular military or law enforcement use, and are easily permeated by water or moisture that can render them inaccurate or even unusable.

Additionally, such devices generally have fixed magnification that allow the user to detect objects, but lack variable magnification capabilities that allow the user to recognize and identify objects once detected. These devices also tend to have relatively short ranges, are bulky, are not economic in design, and lack simplified user controls. Moreover, such devices can be quite costly, often requiring proprietary components and elaborate assembly techniques, making them impractical for widespread military or law enforcement use.

Accordingly, there exists a need for a ruggedized, handheld digital low-light viewing device well suited for military, law enforcement, security and first responder use, with variable magnification (zoom) capabilities, which can be operated with one hand, is lightweight and waterproof, and which contains additional features not presently available in prior devices and operable in conjunction with current low-light sensor technology.

SUMMARY OF THE INVENTION

The present invention provides a low-light viewing device that is easy to hold with one hand and to operate, is waterproof, and provides excellent low-light performance with an integral telephoto zoom lens at a greatly reduced cost, can be assembled using off-the-shelf or custom parts that are easy to obtain or manufacture, thereby further reducing manufacturing cost, and utilizes passive imaging to reduce power supply consumption, aiding in reducing the size and weight of the assembly.

According to an aspect of the present invention, a low-light viewing device comprises a housing having a first end and an opposing second end, the first end defining an optical input aperture and the second end defining an optical output aperture; an infra-red camera assembly responsive to low intensity light and infra red energy received via the input aperture for generating an output image; a signal processor coupled to the camera assembly for processing the output image; a display assembly coupled to the camera assembly for displaying the processed image; a zoom lens assembly coupled to the camera assembly for electronically variably focusing the output image; and control electronics responsive to a control mechanism disposed on a surface of the housing for controlling operating functions of the low-light viewing device, the control mechanism navigable via a user's digit for controlling the operating functions. The assembly of the present invention enables a viewer to detect, recognize, identify and observe objects under low-light conditions at close range or at significant distances.

According to another aspect of the present invention, a handheld digital low-light viewing device comprises a protective housing having a first end and an opposing second end, the first end defining an optical input aperture and the second end defining an optical output aperture; the protective housing contoured to a user's hand, the housing containing: an infra-red camera assembly responsive to low intensity light and infra red energy received via the input aperture for generating an output image; a signal processor coupled to the camera assembly for processing the output image; a display assembly coupled to the camera assembly for displaying the processed image via the output aperture to a viewer; a zoom lens assembly coupled to the camera assembly for electronically variably focusing the output image; and control electronics responsive to a plurality of user-activatable switches disposed on a top surface of the housing and co-located within a region of the housing accessible via a single digit of a user during viewing via the device for controlling operating functions of the digital low-light viewing device. The assembly of the present invention further provides for still image and/or video capture of an object viewed by the assembly by means of a simple control mechanism or switch operatively coupled to the camera assembly and to the signal processor for capturing and processing the image data for storage and retrieval. Memory sufficient to store such image data is included within the assembly, and a mechanism is provided for downloading the stored or captured image data to a remote device (e.g. a printer, computer or other peripheral device), such as a USB port or other interface. The digital low-light viewing assembly of the present invention further includes software and/or hardware functionality for implementing control program functions and enabling user selection of certain program mode features associated with the low-light assembly.

BRIEF DESCRIPTION OF THE DRAWINGS

FIG. 12 is an exemplary illustration of a switch configuration for a control mechanism for a low-light vision assembly in accordance with the principles of the present invention.

DETAILED DESCRIPTION OF PREFERRED EMBODIMENTS

To address the problems of the prior art, the present invention provides a passive imaging ruggedized low-light viewing device capable of converting low-intensity visible light and infrared energy into a visible image. A digital low-light viewing assembly consistent with the present invention generally includes a low-light infrared camera having still/video image capture functionality, an LCD, OLED LCOS, CRT or plasma display and eyepiece lens, a zoom lens assembly, control electronics with one or more multi-position operator switches capable of being manipulated via a single digit of a user's hand while the device is being operated and the target viewed by the user, and standard batteries, all encased in an easily assembled waterproof housing, as will be described in further detail below.

Figure 1:
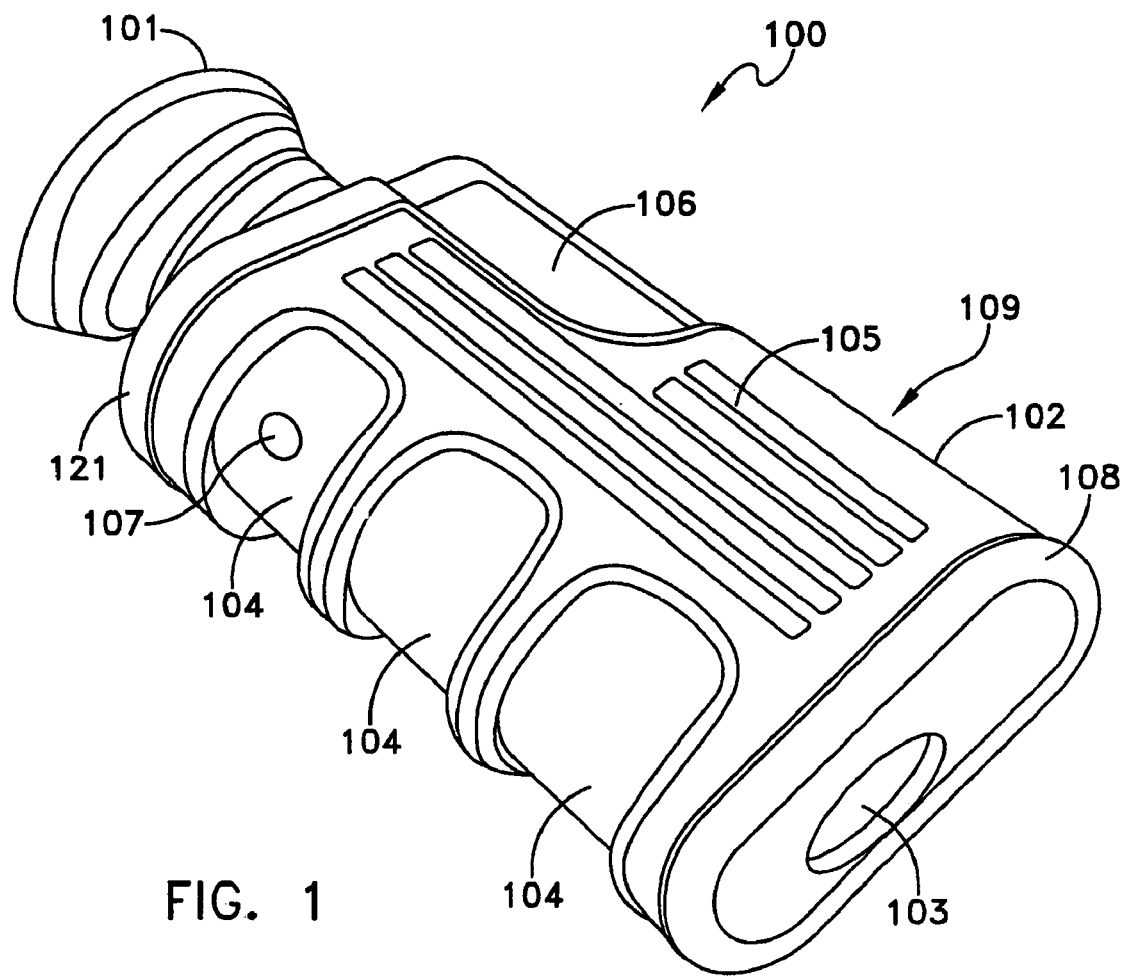
FIG. 1 is a side perspective view of an exemplary low-light viewing assembly consistent with one embodiment of the present invention.
Figure 2:
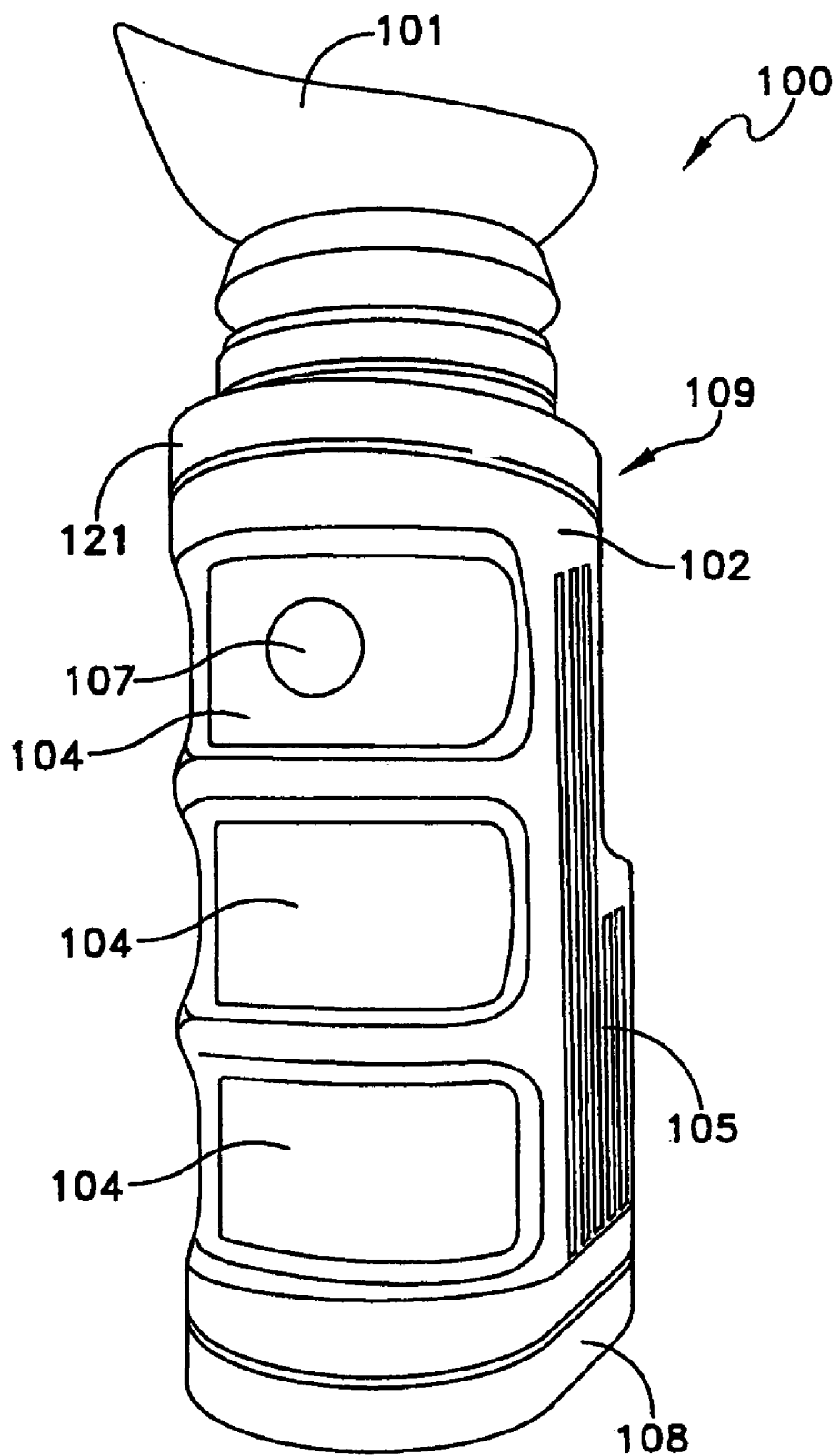
FIG. 2 is a top plan view of the exemplary low-light viewing assembly of FIG. 1.
Figure 3:
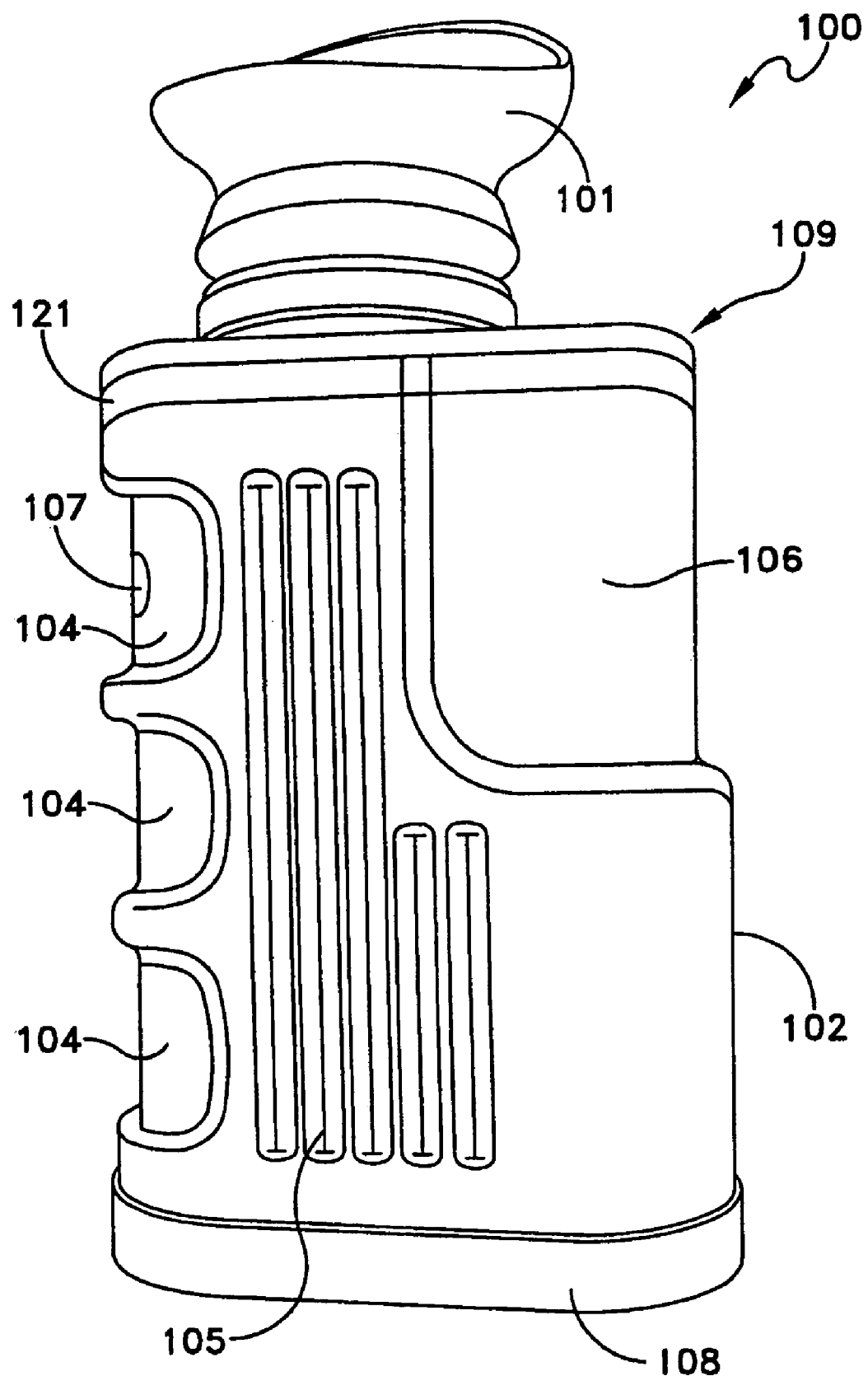
FIG. 3 is a side elevational view of the exemplary low-light viewing assembly of FIG. 1.
Figure 4:
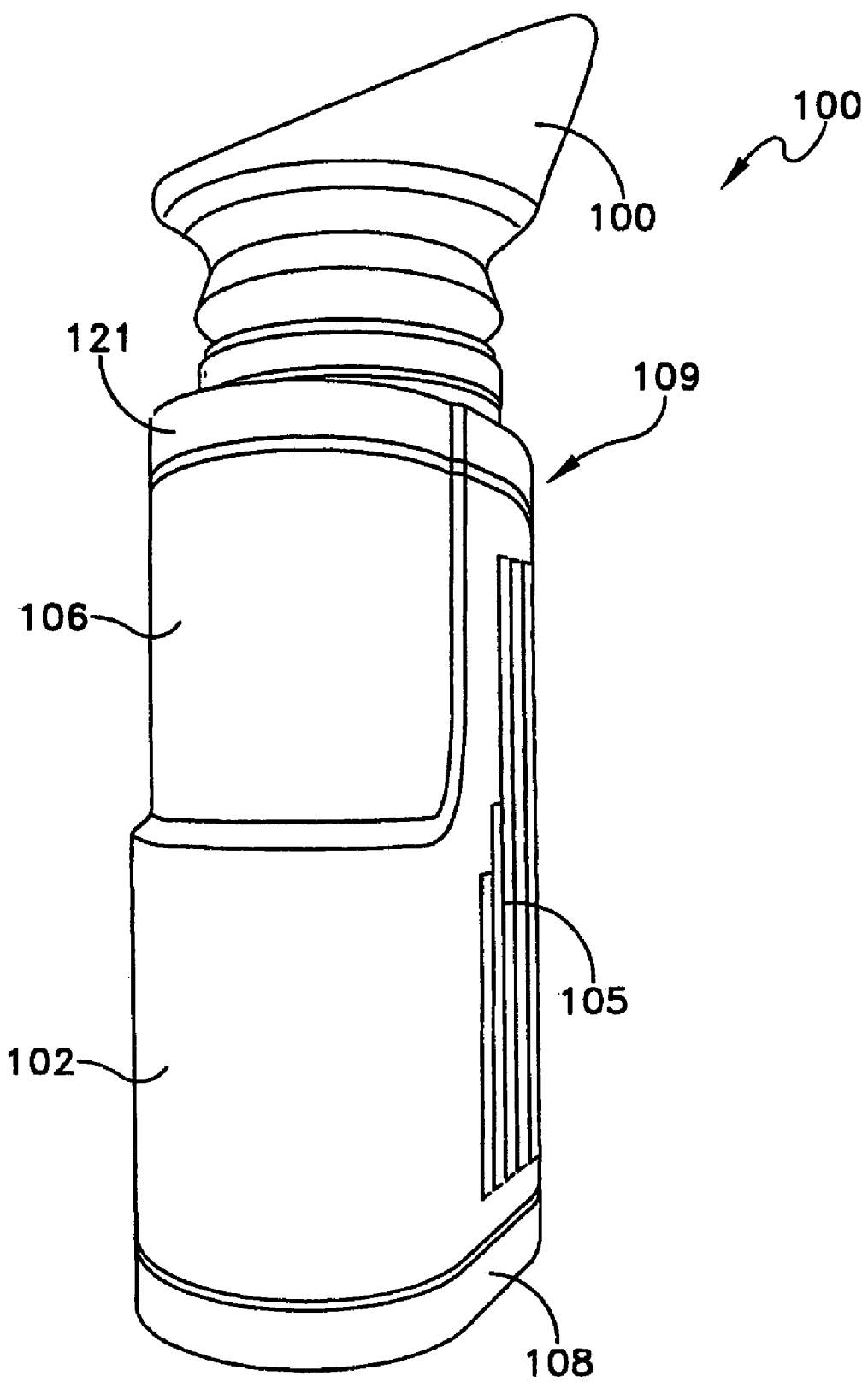
FIG. 4 is a bottom plan view of the exemplary low-light viewing assembly of FIG. 1.
Figure 10:
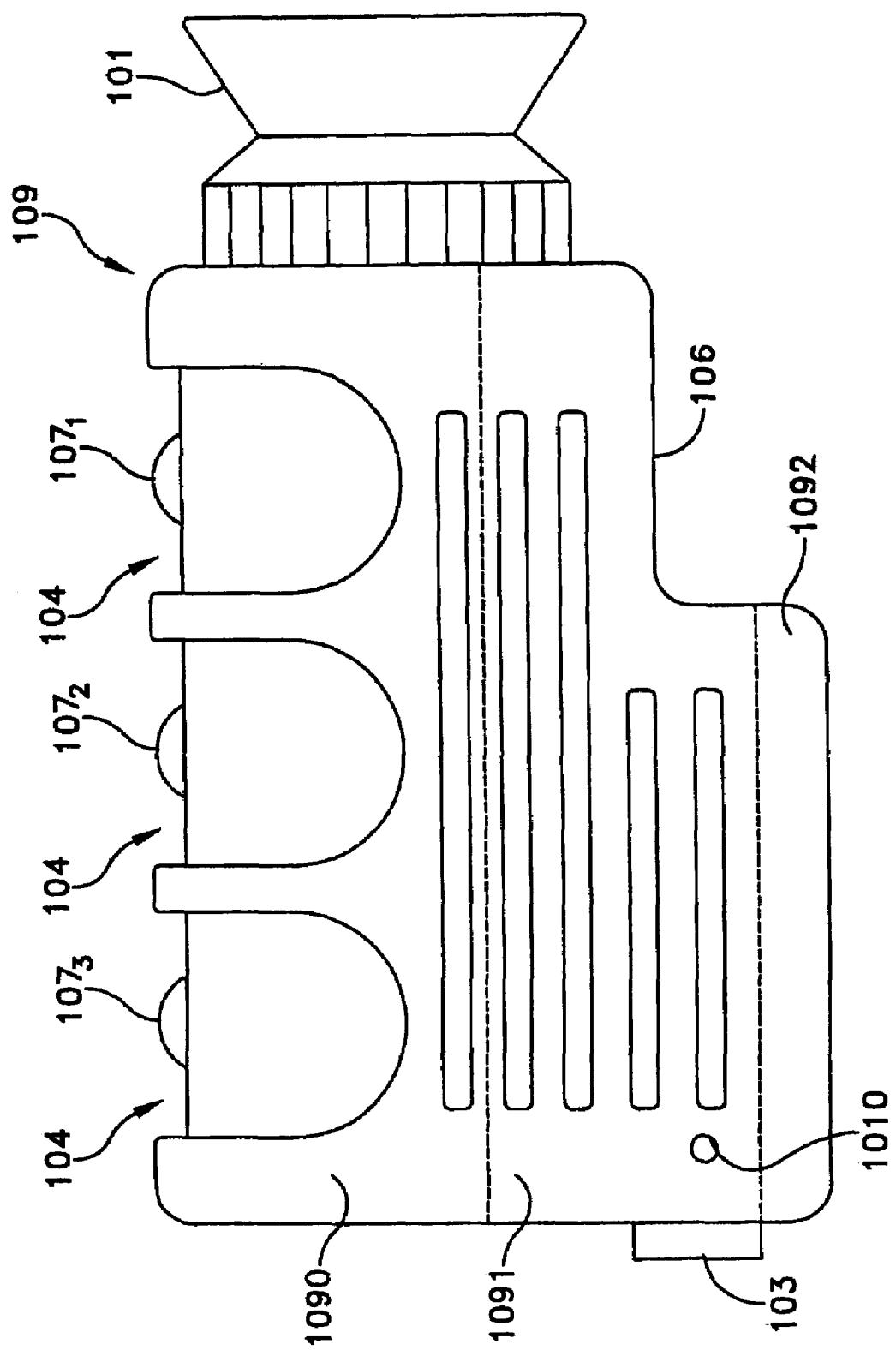
FIG. 10 is a side schematic view of an exemplary low-light viewing assembly according to another embodiment of the present invention having multiple user operated switches on a top surface of the housing.
Figure 11:
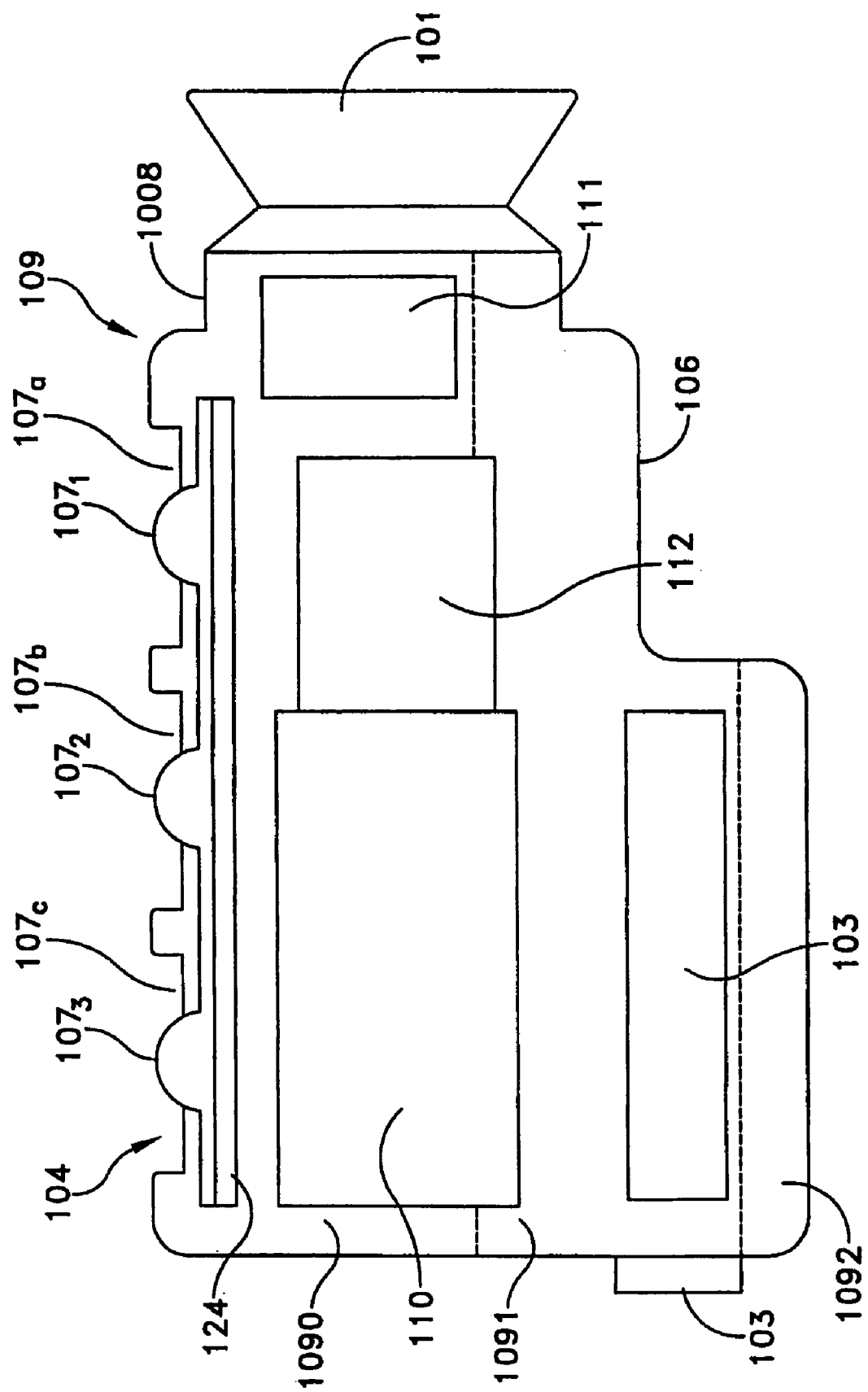
FIG. 11 is a side schematic cutaway view of an exemplary low-light viewing assembly according to another embodiment of the present invention having multiple user operated switches on a top surface of the housing.

With reference now to FIGS. 1 through 6, various external views of an exemplary low-light vision assembly 100 consistent with one embodiment of the present invention are illustrated. As shown, the assembly 100 includes a housing assembly 109 comprising a central portion 102 sealably connected to a front cover 108 and a rear cover 121 at its respective ends. The front cover 108 and rear cover 121 may be made detachable and removable (e.g., by interference or friction fit) for access to components on the interior of the housing assembly 109 (e.g., to change batteries or make repairs) or may be permanently sealed, for example, with a removable or hinged battery cover 1092 (FIG. 10) disposed threadably or by interference or friction fit in a portion of the housing assembly 109. The housing may also be monolithic in structure, or may comprise two halves coupled together, such as a top cover 1090 and bottom cover 1091 (and/or a left side cover and right side cover), as better shown in the embodiments depicted in FIGS. 10-11. All of the exterior components of the assembly 100 are desirably sealed to the housing assembly 109 so as to provide a generally waterproof and moisture-proof device. The housing 109 may be formed from a highly protective material, e.g., a heavy-gauge steel, magnesium, zinc, aluminum, rubberized aluminum, polycarbonate, or plastic material. The assembly may be formed as a monocular device with the housing being contoured to a user's hand, as best illustrated in FIGS. 1, 10 and 11. (Alternatively, it is contemplated that the assembly may be formed as a binocular device.) The housing may further contain within its interior cushioning elements 117 (FIG. 7) such as a foam material, soft rubber, plastic or other cushion-like material, for protecting the internal electronic and mechanical components including the infra red camera assembly, display assembly, zoom lens assembly and control electronics from damage due to drop, vibration and shock.

A plurality of ridges 105 may be formed on one or both sides of the assembly 100 to assist in providing a gripping surface. The ridges may additionally comprise a material having a high coefficient of friction for enhancing grip, such as an elastomer. A plurality of finger holds or recesses 104 may be formed on the top of the assembly 100 to enhance grip capacity, and the finger holds 104 may additionally comprise a material having a high coefficient of friction for enhancing grip, such as an elastomer. Also to enhance grip, a thumb hold 106 may be formed on the bottom of the assembly 100, and the thumb hold 106 may additionally comprise a material having a high coefficient of friction for enhancing grip, such as an elastomer.

A user control mechanism 107 (or a plurality of user control mechanisms) may be disposed in one or more of the recesses or finger holds 104 or the thumb hold 106 of the housing assembly 109 to provide easy accessibility to user-controlled functions, as will be discussed in further detail below. One or more control mechanisms may alternatively be located elsewhere on the housing assembly 109. Other features may be provided in or on the housing 109, such as a lens cover, a tripod mounting socket, a hand or neck strap, or one or more mounts for a detachable strap. The device may have a portion of its housing adapted for mounting to a user's head/helmet, or to a weapon or similar device. Of course, the device may also be embodied in a set of goggles, or attached to or otherwise coupled to conventional goggles for enabling low light viewing and capture/recording of low light image data.

Figure 5:
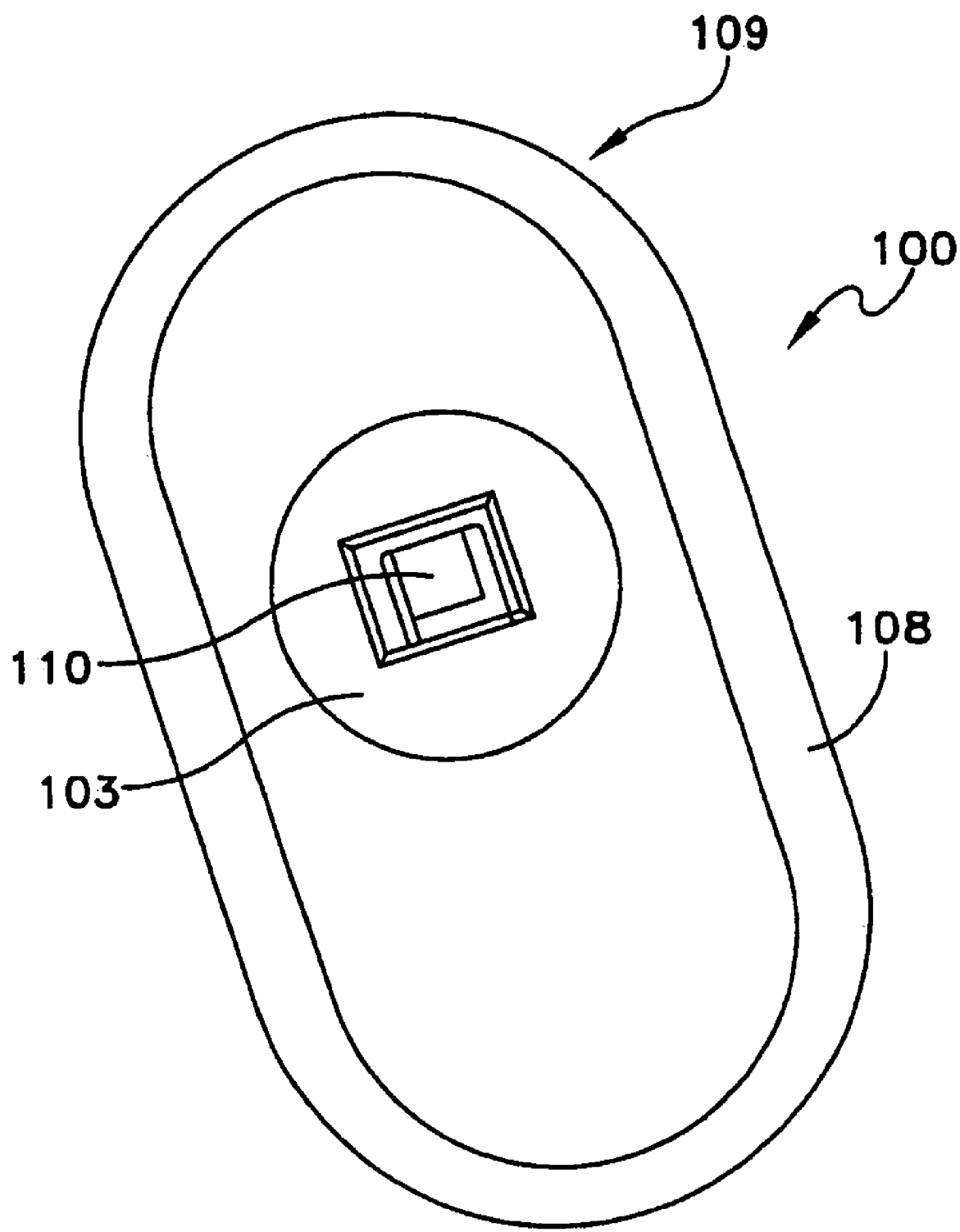
FIG. 5 is a front elevational view of the exemplary low-light viewing assembly of FIG. 1.
Figure 6:
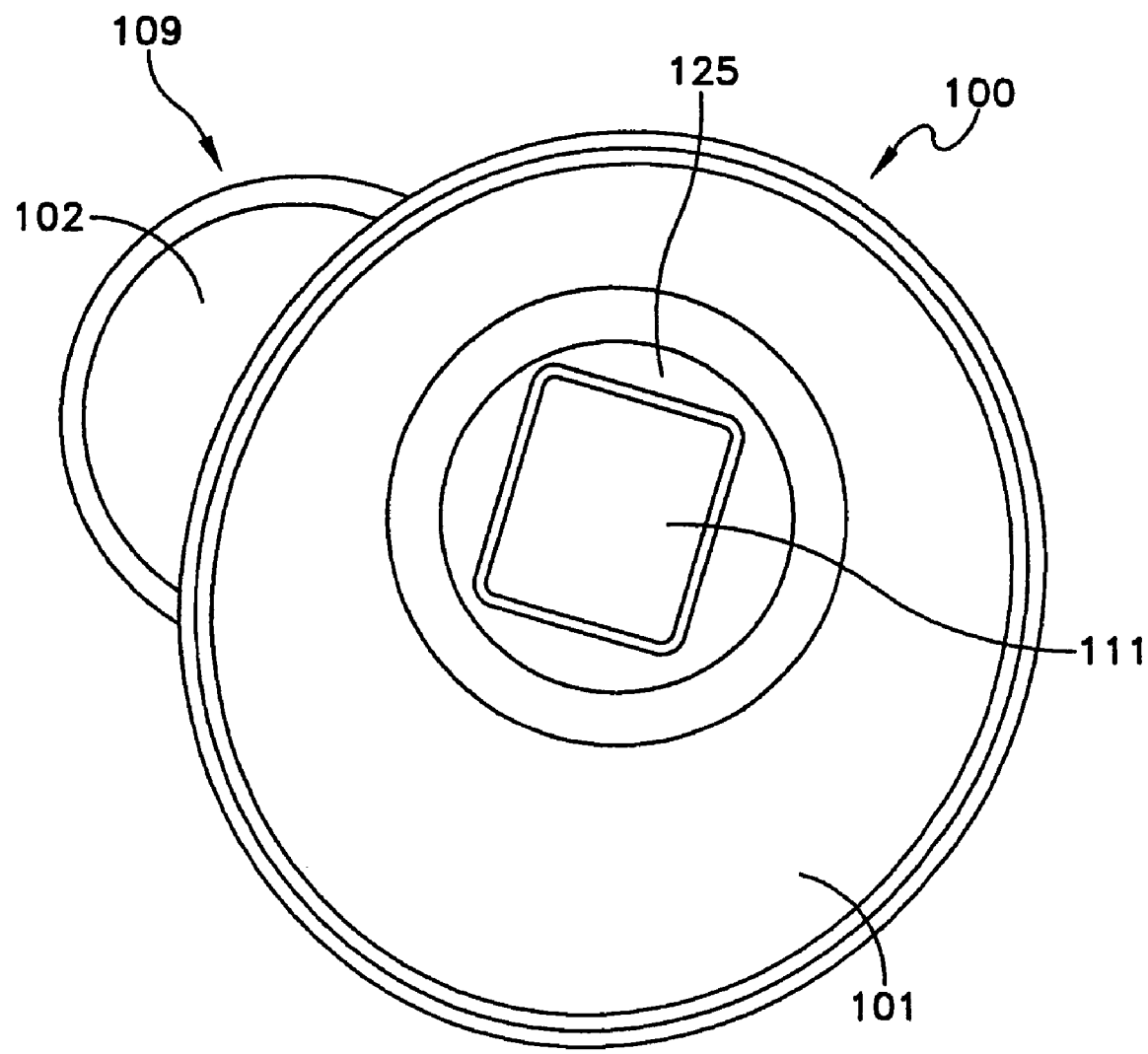
FIG. 6 is a rear elevational view of the exemplary low-light viewing assembly of FIG. 1.

As best seen in FIGS. 1 and 5, an aperture 103 is formed in the front cover 108 at one end (or elsewhere) of the housing assembly 109 that permits an image to be received there through by a zoom lens assembly 100 disposed inside the housing assembly 109, as will be discussed in further detail below. An eyecup 101 is disposed on the rear cover 121 of an aperture at the other end (or elsewhere) of the housing assembly 109 to shield the eye of a user from ambient light during use of the assembly 100. As is best seen in FIG. 6, the eyecup 101 has an aperture 125 formed therein to permit the user to view an image on a display assembly 111 (such as an LCD, OLED, LCOS, CRT, plasma, or other such display) disposed inside the housing assembly 109.

Figure 7:
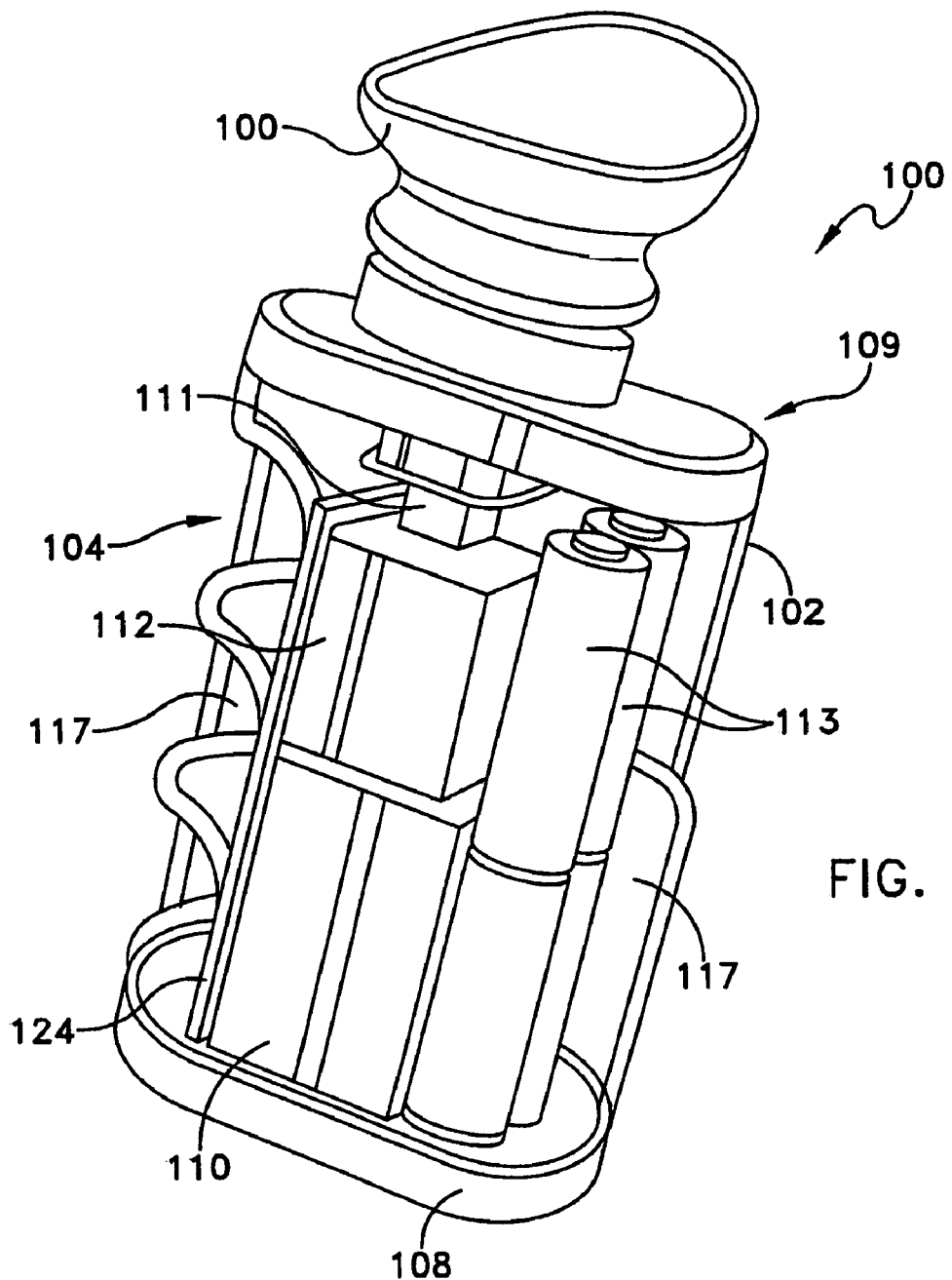
FIG. 7 is a side perspective cutaway view of the exemplary low-light viewing assembly of FIG. 1, with a portion of the housing assembly removed.

Turning now to FIG. 7, a side perspective cutaway view of the exemplary low-light viewing assembly 100 of FIG. 1, with a portion of the housing assembly 109 removed, is illustrated. As shown, the housing 109 of the assembly 100 contains a zoom lens assembly 10 coupled to a camera assembly 112, which is respectively coupled to a display assembly 111. A circuit board 124 containing control electronics is disposed adjacent to and is coupled to the zoom lens assembly 110, camera assembly 112, and display assembly 111. The foregoing components are powered by one or more batteries 113 or other power source. Circuit board 124 may contain various control circuitry including one or more digital signal processors for processing image output from the camera assembly, communications modules (e.g. a wireless communications device) for interfacing with an external communications device (e.g. a computer or other peripheral device via a USB port and connection), and circuitry responsive to tactile user input (via one or more switches) for controlling operating functions of the low-light viewing assembly. Multiple circuit boards may also be used and coupled to one another (e.g. via flexible connectors) for enhanced processing functionality, as is understood by those of ordinary skill in the art.

It is contemplated that some or all of the components of the assembly 100 may connect to the housing 109 and to each other by interference or friction fit with grooves, projections, or other mating features provided therein or thereon, with the use of a minimal number of mechanical fasteners, to make assembly inexpensive and simple. Such fastening mechanisms include but are not limited to screws, bolts, rivets, adhesives, and the like.

Figure 8:
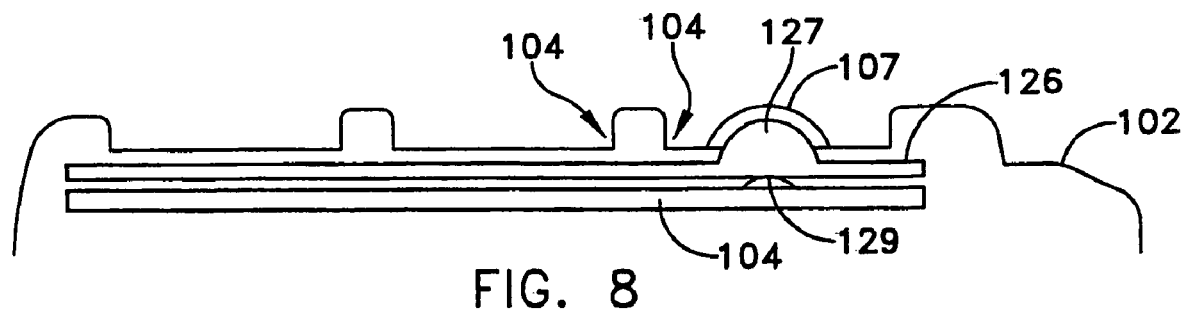
FIG. 8 is a side elevational cutaway view of the exemplary low-light viewing assembly of FIG. 1.

As best seen in FIG. 8, which illustrates a side elevational cutaway view of the exemplary low-light viewing assembly 100 of FIG. 1, an elastomeric planar switch sheet 126 may be disposed between the circuit board 124 and the interior of the housing 109. The elastomeric planar switch sheet 126 may have at least one integral dome shaped switch-actuating projection 127 that extends through an aperture in the housing 109 so as to mechanically couple the user control mechanism 107 with at least one switching element 129 disposed in or on (e.g., surface-mounted) or otherwise coupled to the circuit board 124. Of course, other configurations are also contemplated, including for example, one or more depressible buttons disposed on a substrate having contacts in electrical communication with a switching element on the circuit board, whereby depressing the button(s) causes activation of the corresponding switching element.

In addition to providing a means for tactile engagement of the user control mechanism 107 with a switching element 129 on the circuit board 124, the domed projection 127 also may be used to create a fluid-impermeable seal with the housing 109. The circuit board 124 may be affixed to the interior of the housing 109 in a manner that engages the elastomeric planar switch sheet 126, which may be glued, e.g., by means of a waterproof epoxy or adhesive, or otherwise coupled to the internal surface of the housing 109 and may be maintained in position, for example, by a plurality of pegs (not shown) extending from the housing 109 or other internal components of the assembly 100 so as to align the elastomeric switch sheet 127 with the circuit board 124. The user control mechanism 107 may comprise one or more simple button controls that may be used to control or adjust various functions, including but not limited to on/off state of the assembly 100, brightness of the camera assembly 112 or display assembly 111, focus of the zoom lens assembly 110, and/or program functions for programming or selecting certain modes associated with the low-light viewing assembly.

In an exemplary embodiment, the user control mechanism 107 is a 5-way navigational rocker switch movable along three axes, wherein, e.g., left/right rocking controls zoom of the zoom lens assembly 110, up/down rocking controls brightness of the camera assembly 112, and depressing the switch toggles the entire assembly 100 on or off. In another exemplary embodiment, the navigational rocker switch provides left/right zoom control, down control for controlling camera functions (e.g. image still capture or image video recording) and up control for program functions (e.g. scrolling, controlling date/time settings, left/right hand operation, and programming features including camera mode, file save, digital zoom, ambient light conditions, reticle on/off) while depressing the switch toggles the assembly on/off. The particular directions associated with the operational functions for the user control mechanism may be modified as is understood by one skilled in the art.

With particular reference to the embodiments depicted in FIGS. 10-12, user control mechanism 107 comprises a set of depressible buttons that are co-located within a region 107a of the housing that is accessible via a single digit (i.e. finger/thumb) of a user while the user is holding the assembly and/or viewing objects using the assembly. In one configuration, as illustrated schematically in FIG. 12, the set of depressible buttons includes a rocker switch $107_1$, for controlling zoom in/out, a central On/Off button $107_2$ for powering the device, camera button $107_3$ for controlling still/video image capture, and program button $107_4$ for controlling program mode (e.g. scrolling, controlling date/time settings, left/right hand operation, and programming features including camera mode, file save, digital zoom, ambient light conditions, reticle on/off). Each of the different buttons may include a different surface that provides a different tactile feel to further enable a user to quickly select the desired function while maintaining visual contact with the target through the device.

In one exemplary embodiment, as indicated in FIG. 10, wherein like reference numerals identified in the embodiment of FIG. 1 are used to indicate like parts, the control mechanism is implemented as a set of user operated buttons or switches (e.g. $107_1$, $107_2$, $107_3$) configured in corresponding recesses or finger holds 104 on a top portion of the housing 109. Each recess receives a corresponding digit, and is sized sufficiently such that each digit can effectively access only that button within its corresponding region ($107_a$, $107_b$, $107_c$,) for enabling operating functions associated with that particular button. In one configuration, all of the recesses are uniformly dimensioned. In another configuration, at least one recess or finger hold is configured different from the others.

As further shown in FIG. 10, the one or more user operated buttons may alternatively be disposed on a substantially planar ledge portion 1008 formed proximal to the viewing aperture and adapted for receiving a user's index finger when the user is holding the device. The control mechanism may be completely implemented at this position, or may include additional control buttons or switches (e.g. buttons $107_1$, $107_2$, $107_3$, . . . ) positioned elsewhere on the housing.

Figure 9:
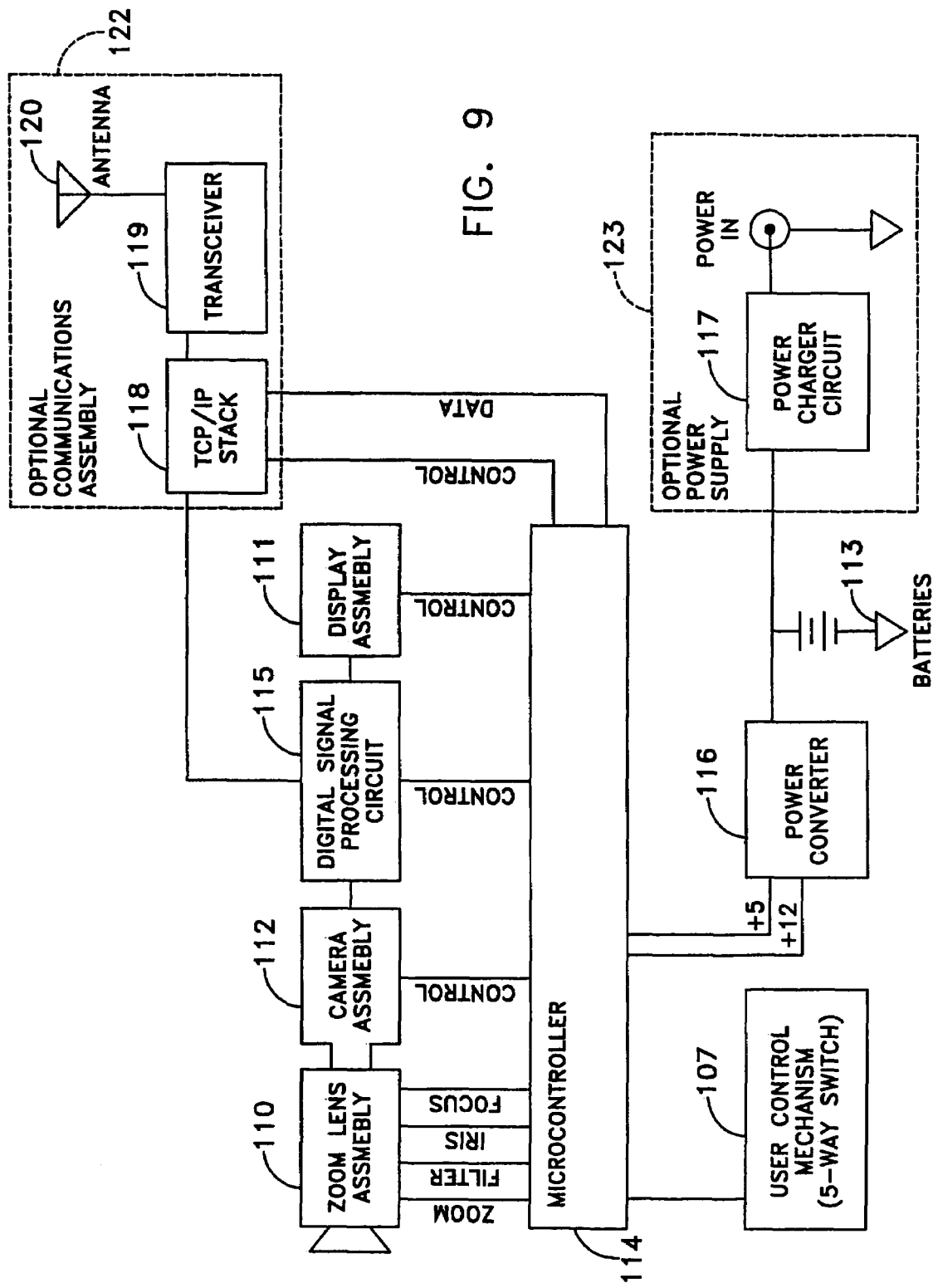
FIG. 9 is a block diagram of an exemplary control system for the exemplary low-light viewing assembly of FIG. 1.

Referring now to FIG. 9, there is shown a block diagram of an exemplary control system for the low-light viewing assembly 100 illustrated generally in FIGS. 1, 10 and 11. The internal structure of the assembly 100 will now be described. The zoom lens assembly 100, camera assembly 112, and display assembly 111 and a digital signal processing circuit 115 are all coupled to and controlled by a microcontroller 114, and all of the foregoing devices are powered by one or more batteries 113 (e.g., two or four 1.5-volt AA size batteries) via a power converter 116 adapted to provide power at, for example 5 and/or 12 volts.

An image received through the zoom lens assembly 100 is received by the camera assembly 112, which, in normal mode, outputs the image to the digital signal processor for subsequent processing and display to the user. In response to user selection of the video capture or still image capture function, the camera assembly provides a corresponding video or still image signal to the digital signal processing circuit 115 for processing and formatting and recording to memory. The processed and formatted video signal is subsequently received by the display assembly 111 to be viewed by a user through the eyepiece 101 (FIG. 1).

In an exemplary embodiment, the zoom lens assembly 110 is a 10× variable optical zoom lens assembly having a focal length of approximately 7.1 mm to 35.5 mm, an aperture of about f/2.8, and a multi-layer anti-reflective lens coating for minimizing reflections and increasing contrast, e.g., the Vario Sonnar™ T* zoom lens manufactured by Carl Zeiss of Oberkochen, Germany. Such zoom lens assembly is included in digital video camera recorders such as model DCR-PC350 manufactured by Sony Corporation of Tokyo, Japan. Of course, other zoom lens assemblies and magnifications (e.g. 5×, 25×, etc.) may be utilized in conjunction with the present invention for providing automatic variable focus/zoom capabilities in accordance with the control mechanism and lightweight features associated with a ruggedized, digital low-light viewing system according to the present invention.

In an exemplary embodiment, the camera assembly 112 is a super-high sensitivity (near IR-spectrum) monochrome camera assembly employing a one half (½) inch interline transfer CCD image sensor having an electronic iris with level control/automatic gain control (e.g., HI:5-50 dB, LO:5-32 dB), an approximately 46 dB signal-to-noise ratio, flickerless mode, backlight compensation, an effective pixel resolution of about 752 to 768×494 to 582, a minimum illumination of approximately 0.0003 lux at F1.4, having variable shutter speeds in the range of around $\frac{1}{50}$ to $\frac{1}{100,000}$ seconds, outputting a 75 ohm unbalanced video signal, and using a DC 12V±10% power supply at a current of about 160 mA. Such camera assembly may be embodied in the WAT-902H2 Supreme™ monochrome camera manufactured by Watec Co., Ltd. of Taipei, Taiwan. It is of course understood that other image/vision sensors may also be used, such as a CMOS (complimentary metal oxide semiconductor) image sensor (which may operate at a lower voltage than a CCD image sensor), for example.

The display assembly 111 is preferably an active-matrix liquid crystal display (LCD) having an approximately 320× 240 spatial resolution, fabricated in a high-speed, low-power CMOS process utilizing single crystal silicon-on-insulator (SOI) starting material. Display assembly 111 further employs integrated horizontal and vertical shift registers with thin film transistors, receiving complementary analog video inputs up to approximately 72 frames per second at voltage levels of approximately 3.3 to 5.0 volts, and consuming about 12 mW of power. Such display may be embodied in, e.g., the KCD-QD01-AA CyberDisplay™ 320 LCD display manufactured by Kopin Corporation of Taunton, Mass. A "LOW BATTERY" indicator may be provided via a red (or other color) light in the Display. It is of course understood that various types of display assemblies having different spatial resolutions (e.g. 600×800 spatial resolution) may be used, with such displays including but not limited to LCD (liquid crystal display), LCOS (liquid crystal on silicon), OLED (organic light emitting device), CRT (cathode ray tube), and plasma displays.

The digital signal processing circuit assembly 115 contains circuitry for processing and formatting the signal output by the camera assembly 112, and displaying a corresponding image on the display assembly 111. The digital signal processing circuit assembly 115 is preferably a video module that provides a composite NTSC or PAL video signal on an approximately 290×218 monochrome display, providing an on-screen display, user -adjustable control over NTSC/P AL selection, backlight brightness, video contrast and brightness~gamma adjustment, and a color killer filter, e.g., the CyberDisplay M KCD-MQOl-BA video module manufactured by Kopin Corporation of Taunton, Mass.

The microcontroller 114 provides, e.g., zoom, filter, iris, and focus control signals to the zoom lens assembly 110 and control signals to the camera assembly 112, digital signal processing circuit 115, and display assembly 111. The microcontroller 114 receives control signals from the user control mechanism 107 to control certain functions, including but not limited to zoom, still/video capture, program functions and turning the assembly 100 on and off. An external power supply 123 may be coupled to the power converter 116 and/or batteries 113 to provide a power charger circuit 117 for charging the batteries 113 and/or to provide power to the assembly 100 during its normal operation, e.g., using 110 V current or a portable external AC or DC power source.

In certain embodiments, the microcontroller 114 may also provide control and/or data signals to an integral or external wireless communications assembly 122 that may also interface directly with the digital signal processing circuit 115. The wireless communications assembly 122 may include, for example, a TCP/IP stack 118, a transceiver 119, and an antenna 120, and may be used, e.g., to transmit to a remote device either a raw video signal from the camera assembly 112 to be processed and formatted remotely, or a processed and formatted video signal output by the digital signal processing circuit assembly 115. Thus, the wireless communications assembly 122 may permit the assembly 100 to interface with, for example, an existing local area network via a standard wireless broadband router, or to interface with another external device for wirelessly receiving communications signals. A video out socket 1010 (FIG. 10) may be provided for wired transmission of a video signal to an external device, such as a monitor, television, or video recorder. Data may be exported via a port provided on the housing, such as a USB port or other such interface. By way of non-limiting example, a USB 2.0 compliant connector may be provided for transferring data to a speed of about 12 megabits per second.

Referring now generally to FIG. 1 in conjunction with FIGS. 10-12, one exemplary mode of operation of the low-light viewing assembly of the present invention is as follows. A user holds the assembly 100 in the user's hand (e.g. right hand or left hand) and depresses the user control mechanism switch (e.g. $107_2$) to turn the assembly 100 on. The user raises the rear end of the assembly 100 to the user's eye and looks through the eyepiece 101, while directing the front end of the assembly 100 toward a location the user wishes to view. The user can view the image provided on the display assembly 111 through the eyepiece 101 and can move the user mechanism control rocker switch (e.g. $107_1$) (see FIG. 12) to the left or right to zoom in and out, can depress user mechanism control switch (e.g. $107_3$) to capture a still image or video image, or can depress user mechanism control switch (e.g. $107_4$) to control program functions associated with the low-light device.

More particularly, with reference to the configuration of FIG. 12, camera/video function operations are selectable by means of switch $107_3$ for still/video capture. For example, for right handed operation, a user may depress and release switch $107_3$ to capture a still video image, or may depress and hold switch $107_3$ to begin recording video data. A user may then release the switch to stop recording. Upon execution of the camera function, a user may depress the switch again to return to "normal" operation (i.e. low-light image viewing and ready to capture additional images) or the system may be pre-configured to automatically return to "normal" operation.

Upon completion of video image processing, a command prompt may appear alerting the user as to whether he/she desires to "SAVE" or "DELETE" the captured video. The user may respond by moving the program switch $107_4$ in one direction (e.g. to the Left for "YES") or another (e.g. to the Right for "NO") or selectively depressing the program button to advance the display to the desired selection so as to either save or delete the video data. Program mode functions associated with switch $107_4$ include placing the device in a camera mode, saving/deleting files, digital zoom, controlling ambient light conditions (e.g. setting thresholds), and providing reverse function buttons (e.g. for left-handed operation), time/language information, and reticle On/Off features. In one configuration, selection of button or switch $107_4$ places the device in program mode, which causes each of the other buttons to correspond to a particular function such as $107_1$ left->scroll left, $107_1$ right->scroll right, $107_2$->Select, $107_3$->scroll up; $107_4$->scroll down.

Program mode further enables a user to modify the functionality associated with the given button geometry according to whether the user is left or right handed. In an exemplary process flow, normal operation for a right handed individual utilizing assembly 100 comprises $107_1$ left->zoom in, $107_1$ right->zoom out, $107_2$->Power select, $107_3$->camera still/video; and $107_4$->program mode (see FIG. 12). The program mode includes programming that enables the user to modify the functions associated with each control mechanism according to whether the user is right or left handed. In an exemplary configuration, the user, upon selecting "LEFT HAND" operation, causes execution of a program to modify the functional capabilities associated with these positions, such that the configuration now becomes $107_1$ left->zoom out, $107_1$ right->zoom in, $107_2$->Power select, $107_3$->program mode; and $107_4$->camera still/video. It is of course, contemplated that other configurations are also possible. When the user is finished using the assembly 100, the user depresses the user control mechanism switch $107_2$ a second time to turn the assembly 100 "Off".

It is understood that the processor, memory and operating system with functionality selection capabilities can be implemented in hardware, software, firmware, or combinations thereof. In a preferred embodiment, the processor functionality selection, threshold processing, panel selection and mode configuration may be implemented in software stored in the memory. It is to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

Further, it is understood that the program storage medium that constrains operation of the associated processors(s), and in the method steps that are undertaken by cooperative operation of the processor(s) on the messages within the signal and data processing network of the digital low-light viewing assembly. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

As previously discussed, the digital low-light viewing assembly of the present invention includes a digital signal processor coupled to the camera assembly and zoom lens assembly. The signal processor is operable in response to a control input for providing program functions (such as gain, integration, clock functions, left/right hand operation, and switch button functions), power ON/OFF functions, and zoom in/out capabilities. In an exemplary configuration, an image capture may be obtained using a single control switch (e.g. a press and release switch) for capturing still video images and storing the images in memory within the assembly for later retrieval and/or downloading.

In an exemplary embodiment, the assembly 100 is extremely lightweight and simple and inexpensive to manufacture, due to the use of lightweight and inexpensive optical components, is only about 4 inches in length D, and can easily and unobtrusively be concealed, carried, or held in the pocket or hand of a user. The assembly 100 in an exemplary embodiment can operate in very low-light conditions, for example, 0.003 lux, and can be used to view objects up to 2 kilometers (km) away. Employing a single one-finger user control mechanism 107 for all user-controlled functions of the assembly 100 eliminates the need for the user to move the user's hands or fingers from the assembly 100, or to remove the assembly 100 from the user's eye to locate a control switch on the housing 109 during use. In an exemplary configuration, the relative size of the region 107a for accommodating the control mechanism is about 0.75 inch.

It is further contemplated that a device consistent with the present invention, in addition to having utility as a standalone handheld viewer, may also have particular utility for other applications, e.g., as a sight for a gun or other weapon. While the embodiments described above and illustrated herein are configured as a monocular device, it is contemplated that the assembly could alternatively be embodied in a binocular display to provide stereoscopic views. Such binocular device configuration would also be contoured to a user's hand(s) to simple manipulation and ease of use.

Thus, it can be seen that the present invention provides digital low-light viewing device that can be easily and inexpensively manufactured, thereby making the device affordable to consumers, law enforcement agencies, security forces, first responders and the military.

Although the present invention has been set forth in terms of the embodiments described herein, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the present invention be interpreted as encompassing all alterations, modifications, or alternative applications as fall within the true spirit and scope of the invention.

What is claimed is:

1. A passive digital low-light viewing device comprising:
   a housing having an optical input aperture and an optical output aperture; said housing having:
   a lens assembly for focusing low intensity visible light received at the optical input aperture;
   a camera assembly responsive to low intensity visible light and infrared energy received via said input aperture and said lens assembly for generating an output image signal containing components from the received visible light and the received infrared energy;
   a signal processor coupled to said camera assembly for processing said output image signal;
   a display assembly coupled to said camera assembly for displaying the processed image via said output aperture to a viewer; and
   a control mechanism disposed on a surface of said housing said control mechanism operatively coupled to said camera assembly and said display assembly for controlling operating functions of said camera assembly and said display assembly.

2. The passive digital low-light viewing device of claim 1, wherein said controlled operating functions comprise at least a digital zoom function and power functions.

3. The passive digital low-light viewing device of claim 1, wherein said housing is watertight.

4. The passive digital low-light viewing device of claim 1, further comprising cushioning material disposed in the interior of said housing for protecting said camera assembly, against drop, vibration and shock.

5. The passive digital low-light viewing device of claim 1, wherein the signal processor coupled to said camera assembly for processing said output image, provides still and video image capture, storage and replay, and image export to an external device.

6. The passive digital low-light viewing device of claim 5, further comprising a wireless communications assembly disposed within said housing and responsive to a control signal for transmitting video to an external device.

7. The passive digital low-light viewing device of claim 1, wherein said control mechanism comprises one or more user-operated switches disposed on a surface of said housing.

8. A method of controlling a low-light viewing device having a housing, a lens assembly mounted on the housing, a camera assembly in the housing, the camera assembly responsive to low-intensity visible light and infrared energy and for outputting a display image, and a display assembly mounted on the housing for displaying the display image, comprising the steps of:
   receiving a power control signal from a user control mechanism operable by a digit of a user;
   powering on the device in response to receiving the power control signal;
   passively receiving low intensity visible light and infrared energy via the lens assembly;
   receiving a camera assembly control signal from the user control mechanism; and
   controlling the camera assembly in response to the camera assembly control signal;
   outputting a display image signal containing components from the received visible light and the received infrared energy from the camera assembly to the display assembly; and
   displaying the image via the display assembly.

9. The method of claim 8, wherein said step of controlling the camera assembly comprises causing the camera assembly to perform an image capture function.

10. The method of claim 8, further comprising the steps of receiving a program mode signal from the user control mechanism and controlling program functions associated with the low-light viewing device in response to said program mode signal.

11. The method of claim 10, wherein said step of controlling program functions comprises placing the device in a camera mode.

12. The method of claim 10, wherein said step of controlling program functions comprises controlling ambient light conditions.

13. The method of claim 10, wherein said step of controlling camera functions comprises controlling video recording.

14. The passive digital low-light viewing device of claim 4, wherein said housing is watertight.

15. The passive digital low light viewing device of claim 14, wherein said housing is configured as a monocular.

16. The passive low light viewing device of claim 15, wherein the housing is formed from a metal.

17. The passive low light viewing device of claim 16, further comprising a plurality of ridges of an elastomer formed on at least one side of the housing.

18. The passive low light viewing device of claim 15, wherein the housing is contoured to a user's hand.

19. The passive low light viewing device of claim 15, further comprising an eyecup.

20. The passive low light viewing device of claim 1, wherein said controlled operating functions include ambient light conditions.

* * * * *

UNITED STATES PATENT AND TRADEMARK OFFICE
CERTIFICATE OF CORRECTION

PATENT NO.         : 7,420,153 B2
APPLICATION NO. : 11/638203
DATED               : September 2, 2008
INVENTOR(S)       : Gary Palmer and Jeffrey Kennedy It is certified that error appears in the above-identified patent and that said Letters Patent is hereby corrected as shown below:

Claim 1, Col. 11, line 16, insert a comma after "housing" to change "housing" to --housing,--
Claim 8, Col. 12, line 15, delete the word "and"
Claim 13, Col. 12, line 1, change "claim 10" to --claim 8--

Signed and Sealed this

Second Day of December, 2008

JON W. DUDAS
*Director of the United States Patent and Trademark Office*